United States Patent [19]

Stokstad

[11] 3,758,217

[45] Sept. 11, 1973

[54] OPTICAL BENCH AND COMPONENTS THEREFOR

[76] Inventor: Paul A. Stokstad, 85 Estabrook, San Leandro, Calif. 94577

[22] Filed: Oct. 20, 1971

[21] Appl. No.: 190,806

[52] U.S. Cl. .................. 356/256, 350/245, 350/257, 248/361, 248/467

[51] Int. Cl. .......................................... G02b 27/32

[58] Field of Search ..................... 356/256; 350/245, 350/257, 110; 248/467, 361

[56] References Cited

UNITED STATES PATENTS

| | | | |
|---|---|---|---|
| 2,959,832 | 11/1960 | Baermann | 24/201 |
| 2,953,970 | 9/1960 | Maynard | 350/257 |
| 2,803,986 | 8/1957 | Choiniere et al. | 350/245 |

OTHER PUBLICATIONS

"New Optical Bench," by Barnes, N. Jrnl. Opt. Soc. Amer. Vol. 34, No. 2 February, 1944

"New Materials & Components," by Harris, F. Rev. Sci. Instr. Vol. 42, No. 7 July, 1971

*Primary Examiner*—David Schonberg
*Assistant Examiner*—Paul K. Godwin
*Attorney*—Robert E. Wickersham et al.

[57] ABSTRACT

An optical bench having a horizontal flexible plastic magnetic surface and a longitudinal guide rail. Each of a plurality of component carriers has a flat ferromagnetic metal pad on its bottom surface and means such as a straight edge for engagement with the guide rail. Thus, the component carriers are held in any desired position by the attraction of the magnetic plastic for the metal pad, while its engagement with the guide rail provides lateral alignment. Some, at least, of the component carriers have a vertical frame supported by the flat pad, a central opening, and flexible magnetic plastic surfaces on at least one face of the frame. The components comprise plates having on one face an area of ferromagnetic metal, and an optical instrument that aligns with the opening on the carrier. Similar attachments include a disc component parallel to the bottom pad and having a plastic magnetic surface for engagement by another disc that has a metal pad and carries a component and is aligned by a center pin to the magnetic disc and is held in any position thereon by magnetic attraction. Also rotatable components are provided which are circumscribed within the optical opening and aligned by it.

23 Claims, 10 Drawing Figures

INVENTOR.
PAUL A. STOKSTAD
BY Robert Ellenberger
Owen, Wickersham & Erickson
ATTORNEYS

INVENTOR.

PAUL A. STOKSTAD

BY [signature] Owen, Wickersham & Erickson

ATTORNEYS

INVENTOR.
PAUL A. STOKSTAD
BY Robert E. Wickenberg
Owen, Wickersham & Erickson
ATTORNEYS

OPTICAL BENCH AND COMPONENTS THEREFOR

BACKGROUND OF THE INVENTION

Optical benches, which are used in experimental laboratories and also in laboratories in universities, colleges, technical institutions, and high schools have been relatively expensive. One reason for their high cost has been that they required much machining to precision standards, and their precision-machined surfaces and edges have often been subjected to serious and costly damage when used by inexperienced students who may dent, twist, or otherwise damage the carefully made rails on which the attachments slide. Screws have sometimes been over-tightened, and other mechanical fastening means have often been jammed. Sometimes the components have been bent and sometimes they have been broken when subjected to an accidental shock, such as can be caused by students bumping the bench hard.

In general, there seems to have been no good way heretofore of avoiding the high cost of making optical benches. A general object of the present invention is to provide an optical bench which is fully satisfactory and is, in fact, in many ways an improvement over the optical benches heretofore known, while being much less expensive and much less prone to damage.

SUMMARY OF THE INVENTION

The invention incorporates a magnetic positioning system employing flexible magnetic strip material and metal pads, such as pads of stainless steel. Thus, the optical bench itself has its upper surface formed from flexible magnetic plastic, which produces a large area of non-polarized moderate-strength magnetic field. This magnetic field interacts with stainless steel pads on the lower surfaces of the component carriers which engage the bench and provides a force that holds the pad to the magnetic material, thus holding the component carrier to the bench. The coefficient of friction between the two materials tends to hold them in a relatively fixed position. A guide rail may extend above the magnetic plastic surface, typically on one side edge, and the components may be provided with a straight edge or other element that engages this guide rail to provide lateral alignment in a simple but every effective manner.

The components themselves are mounted on the carriers in a novel manner. The carriers, which have the metal pad on their bottom, have an element thereabove that may be provided with a magnetic surface of the same type as the bench, made from the same flexible plastic magnetic material. Sometimes these surfaces of the carriers are horizontal, and sometimes they are vertical. The components themselves may be mounted in frames with ferromagnetic metal surfaces that can engage the flexible magnetic material. All sorts of components can be provided and alignment and holding assured without the use of ball bearings, thumbscrews, and the many expedients which have heretofore been used. A wide variety of components can be similarly mounted and can be transferable from one component carrier to another, or it can be mounted permanently on a carrier where that is desired. Rotation is easily provided, as well as lateral stability, and the parts can be held in any desired rotary position by a combination of an alignment center pin and the magnetic attraction.

The flexible magnetic surface tends to give on minor blows, instead of bending or breaking, and on major blows, the bond between the magnetic material and the bed is sundered, but it can easily be readhered in place.

A BRIEF DESCRIPTION OF THE DRAWINGS

DETAILED DESCRIPTION OF SOME PREFERRED EMBODIMENTS

Figures 1, 2, 3:
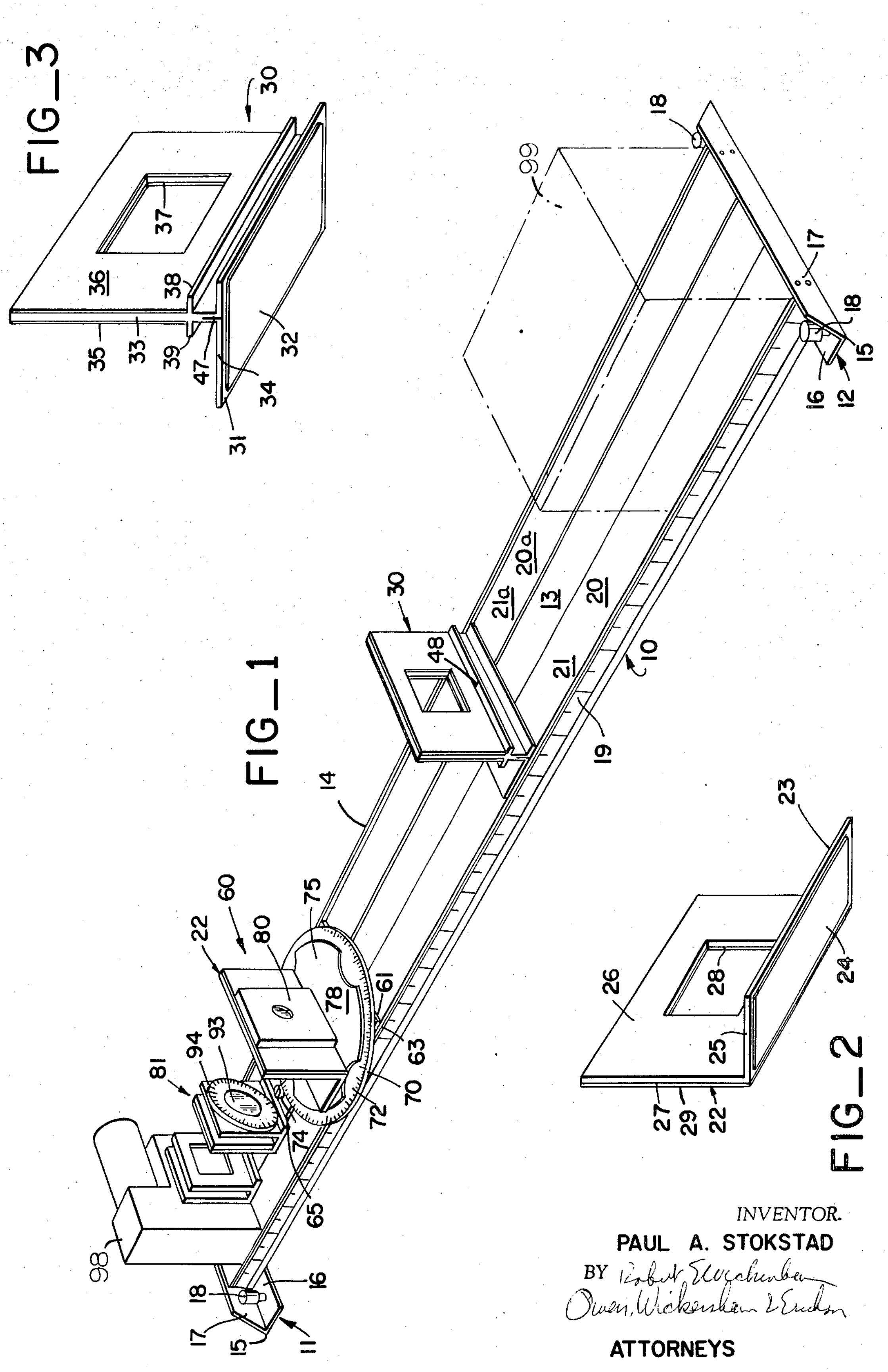
FIG. 1 is a view in perspective of an optical bench embodying the principles of the invention, with some components and component carriers shown in solid lines and others shown in broken lines.
FIG. 2 is a view in perspective of one of the component carriers of the invention.
FIG. 3 is a similar perspective view of a modified form of component carrier.

The principles of the invention are illustrated in FIG. 1 by a preferred form of optical bench 10 comprising end support members 11 and 12 and a longitudinally extending support member or bed 13. Along one edge of the member 13 and projecting above its upper surface is a guide rail 14. Each end support member 11 and 12 may comprise an aluminum angle 15 having a horizontal portion 16 and a vertical portion 17. The bench base support member 13 bridges the two members 11 and 12, resting on the horizontal portions 16 and abutting against and secured to the vertical portions 17, as by screws. Each of the end members 11 and 12 preferably has a pair of leveling screws 18 which are used to eliminate torque on the bench bed 13 that might result when the surface on which the members 11 and 12 rest is not level. On the edge opposite the guide rail 14 an indexed scale 19 may be provided to indicate longitudinal distances along the bench 10.

On the bench support bed 13, I provide one or more strips 20 and **20*a* of flexible magnetic material made from magnetized plastic, as known in the art. This per se known material comprises strongly magnetic material dispersed in a rubber-like material, and the material is made in strips which have substantially flat upper and lower surfaces. The strips 20, 20*a* may be made by extrusion, and their upper surfaces 21 and 21*a* can be flattened by heat and pressure after installation on the bench bed 13 to provide a level optical bench surface. As shown in FIG. 1, I may use two such strips 20 and 20*a*, and these may be spaced apart from each other. Alternatively, I may use a solid strip that covers the entire width of the bed 13, or there may be a single strip narrower then the bed 13, or there may be more than two strips, spaced apart or next to each other. There are some advantages in the two spaced-apart strips 20 and 20**a as shown, in that the space between them is therefore recessed and may accommodate projections from the component carriers, while also reducing somewhat the force of friction and making it easier to get a flat surface.

Component carriers of various types may be used. Thus, FIG. 2 shows a simple component carrier 22 having a flat base 23 having on its lower surface one or more flat pads 24 of ferromagnetic material, such as stainless steel, affixed by any suitable means. This metal pad 24, being ferromagnetic, is readily engagable with the magnetic strips 20 and 20a, adhering well to the upper surfaces 21 and 21a in any position in which it may be placed, and yet being readily pushed therealong. The component carrier 22 also has two straight edges 25 along opposite sides of the base 23 for engagement of either one of them with the guide rail 14 to assure proper lateral alignment. At one end of the base 23, a vertical support member 26 is provided, having a metal frame 27 with a rectangular opening 28. Adhered to the frame 27 is a similarly shaped frame of magnetic plastic material 29, the same material as the strips 20 and 20a, which serves to mount and align an optical component, such as one of those shown in FIGS. 4 and 5.

FIG. 3 shows a modified form of component carrier 30, having basically the same structure but better suited to general use. It includes a base 31, a metal pad 32 adhering to the lower surface of the base 31, an upstanding vertical support frame 33, and two straight edges 34 so that it can be turned either way. In this instnace, two magnetic plastic frames 35 and 36 are provided, one on each face of the vertical member 33, all these members having a central rectangular opening 37, which helps to align some of the component carriers. In this instance it will be noted that the vertical frame 33 also supports a pair of shelves, a shelf 38 on one side and a shelf 39 on the other side, to aid in supporting or aligning a component at a vertical height above the base 34. An index line 47 is provided for reading against the scale 19, and an index line 48 is provided on each shelf 38 and 39 for indexing rotation of a component like the polarizer 93 of FIG. 1.

Figure 4:
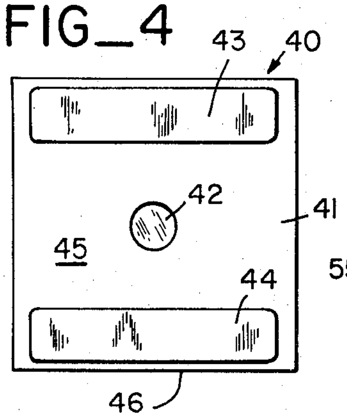
FIG. 4 is a view in rear elevation of one of the components that is to be mounted on a component carrier.

As shown in FIG. 4, a component 40 may comprise a rectangular or square mounting plate 41 having an optical component 42 in the center and having a pair of ferromagnetic metal strips 43 and 44 adhered to one surface 45 of the plate 41. The pads 43 and 44 engage the magnetic frame 29 of the carrier 22 or one of the magnetic frames 35 or 36 of the carrier 30 and hold the component 40 in place. Its lower edge 46 may be above or may rest on the base 23 of the carrier 22 or may be above or may rest on one of the shelves 38 or 39 or the carrier 30, so that the component 42 is easily aligned with the frame opening 28 or 37.

Figure 5:
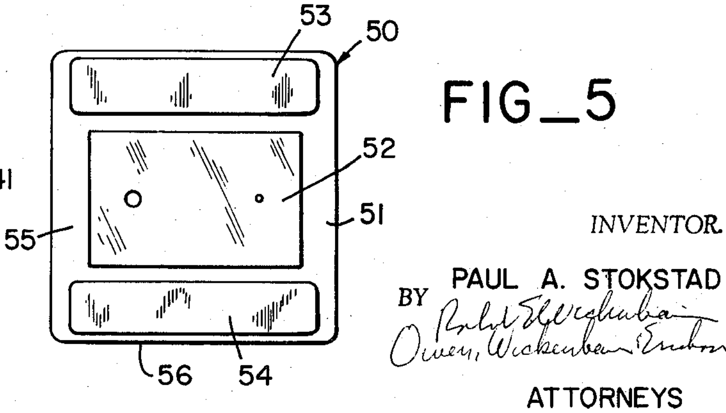
FIG. 5 is a similar view of another such component.

Similarly, a component 50 of FIG. 5 is provided with a plate 51, an optical member 52, metal pads 53 and 54 on a surface 55 of the plate 51, and a bottom edge 56 may serve to provide desired alignment or may be spaced above a shelf 38 or 39 or base 23.

In place of the guide rail 14 being at one side, it may be in the middle with the component carriers having depending fingers or slots to engage the guide rails. Any suitable guide combination that can achieve the desired alignment can be used. Also, the components may have the vertical magnetic pads and the component carriers may have the stainless steel pads.

Figures 6, 7:
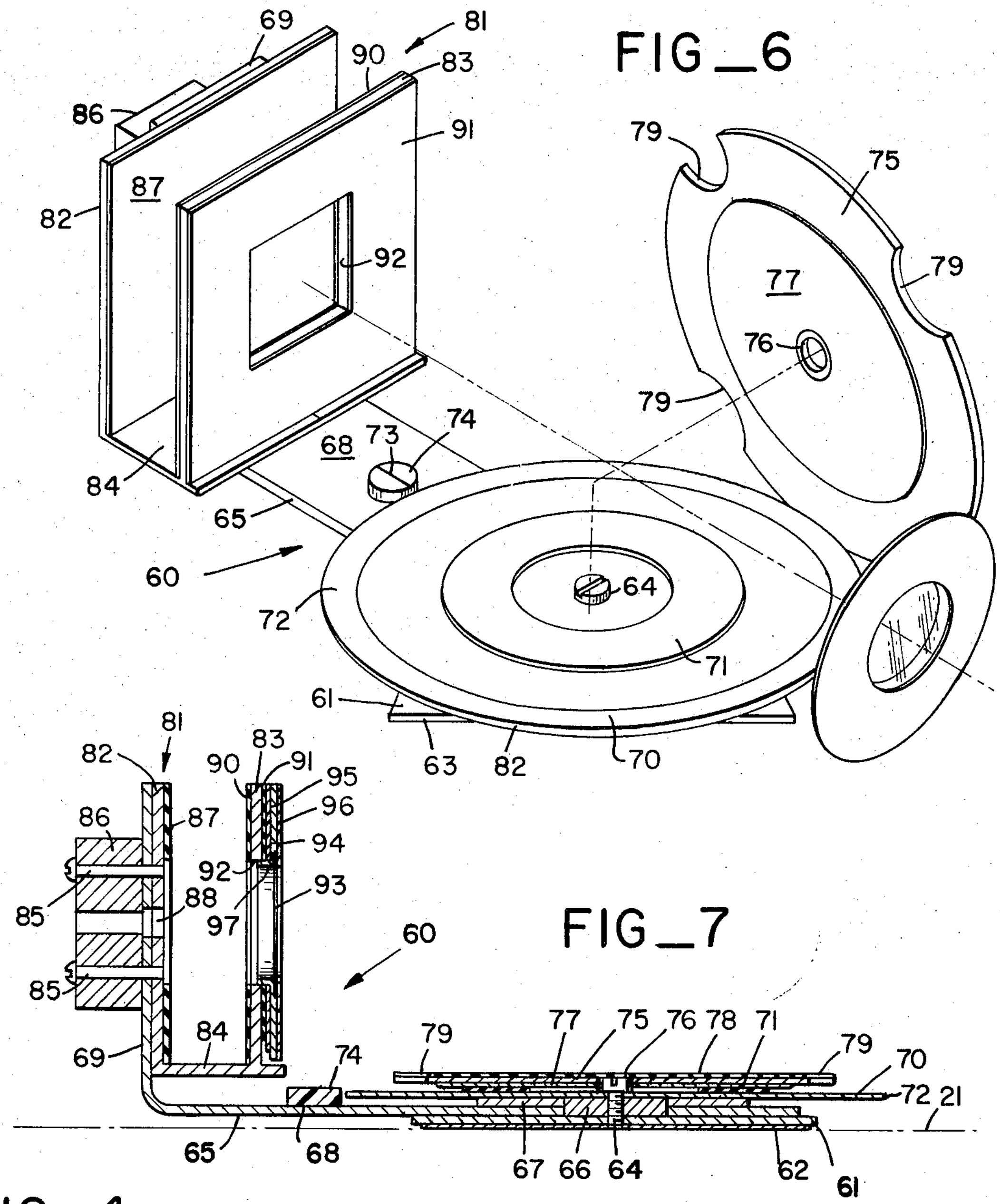
FIG. 6 is a partially exploded view in perspective of an assembly which is mounted on a modified form of component carrier. This assembly is also shown in FIG. 1, mounted on the bench.
FIG. 7 is a view in elevation and in section of the assembly of FIG. 6.

A more complex sub-assembly or component-carrier 60 is illustrated in FIGS. 6 and 7. The sub-assembly 60 has a base member 61 having on its lower surface one or more metal pads 62 which engage the surfaces 21 and 21a of the strips 20 and 20a and adhere to them. These pads 62 may again be made of stainless steel. The base member 61 is a flat horizontal plate having an edge 63 for engaging the guide rail 14, and extending up from it is a center stud or bolt 64. Rotatably mounted above the plate 61 is an angle-bracket member 65, which rotates around a hub plate 66 that is in place flat against the plate 61 by the bolt or stud 64. Above the member 65 is a spring washer 67 that keeps the bracket member 65 from wobbling and from touching the plate 70. The angle bracket 65 has a horizontal portion 68 and a vertical portion 69. Above the horizontal portion 68 and spaced from it by the hub plate 66 and washer 67 is a disc 70, which is provided with a magnetic annular plastic strip 71, which is spaced from both the center and from the edge. Around the edge of the disc 70 there may be a calibrated scale 72 to indicate degrees of arc, while the angle bracket 65 is provided with an index line 73 on an index member 74, for reading the angle between the bracket 65 and the scale 72. The stud or bolt 64 holds the disc 70 stationary relative to the base member 61.

Above the disc 70 is a disc 75, having a central opening 76 engaging the stud or bolt 64 for rotation of the disc 75. The disc 75 has an annular ferromagnetic metal pad 77 on its bottom surface and a magnetic plastic disc or annulus 78 on its upper surface. It has four arcuate cutouts 79 around its edges at 90-degree intervals. The metal pad 77 enables securing the disc 75 to the disc 70 in any desired relative rotational position, with the opening 76 and stud or bolt 64 providing center alignment. The disc 75 can be rotated over the disc 70 by applying rotational force to it, as by grasping two diametrically opposite cutouts 79, with this force exceeding the coefficient of friction between the parts 71 and 77. The magnetic plastic material 78 is like that of the strip 20 and serves to support a component carrier, such as the component carrier 22 shown on it in FIG. 1 carrying a suitable optical component 80. Thus the component carrier 22 may be positioned at any place desired with disc 75, which itself may be rotated to any desired position.

The bracket 65 extends beyond one edge of the disc 70 and at one end has the upstanding vertical arm 69 which either magnetically or, as shown in this case, mechanically, may support a complex component holder 81 having two vertical portions 82 and 83 joined by a base member 84. The vertical portion 82 is secured to the arm 69 by bolts 85 and a pad 86, and the forward surface of the portion 82 has a magnetic plastic frame 87 around a central opening 88. The vertical portion 83 has two such magnetic plastic frames 90 and 91 bordering a rectangular opening 92. Any of the magnetic plastic frames 87, 90, and 91 may support an optical component, such as the rotatable polarizer 93 (or a quarter-wave plate) shown on the frame 91 in FIGS. 1 and 7. The polarizer 93 is round and is carried by a round aluminum polarizer mount 94, having a ferromagnetic metal pad 95 on one surface and an angularly indexed cover member 96 on its other surface. The member 96 holds the polarizer 93 in place on the mount 94 to assure alignment of the polarizer 93 relative to the scale on the member 96. The square opening 92 and a round portion 97 of the polarizer mount 94 enable accurate alignment and centering and also enable rotation of the polarizer 93 while keeping it aligned. This rotational mounting itself has significant novelty. It provides for rotation without any mechanical bearings but simply magnetic bearing of contact and it retains the position to which it is set after the torque has been removed.

In addition to the components and component carriers shown in the drawings, there may be many forms of them. A linear translator 98, shown in broken lines in FIG. 1, may have a ferromagnetic bottom surface and one wall vertical and straight, to provide the necessary alignment and retention. Other components may be provided, including a light source 99, also shown in broken lines in FIG. 1, a photo-multiplier tube, photometers, and various instruments as long as each is provided with a base having the needed ferromagnetic pad, and a surface on one edge to provide alignment with the guide rail 14.

In use, any of these components or component carriers is placed on the bench 10, aligned with the aid of the guide rail 14 and with the scale therealong to any desired position longitudinally on the bench 10 but always against the guide rail 14 to assure proper alignment. Any component is placed wherever it is desired and is retained magnetically. The position is indicated by the scale and by having indexing means on each component, it is easy to measure the distances from one component to another. The component or carrier may be lifted off easily or may be pushed along the bench by exerting a force that exceeds the coefficient of friction. Moreover, the parts can be pushed along very smoothly because of the type of contact, which is quite different from metal-to-metal contact, being smooth and having a good feel, and stopping very easily at any desired position.

Thus, it will be seen that the bench and its accessories can largely be assembled from well-made strip material without any special machining, since such strips can be made accurately by extrusion or otherwise and provided with completely flattened surfaces. The straight guide rail 14, the level bed 13, the strip surfaces 21 and 21a, the component bases 23 and 31 — all these things are readily made without difficult machining. Moreover, when the device is in use, students cannot readily damage the materials when using them with any degree of care, and they are able to stand up under a good deal of misuse. If they are damaged, it is still easier and less expensive to replace them than it would be to replace the delicate parts of the optical benches heretofore known.

Figure 8:
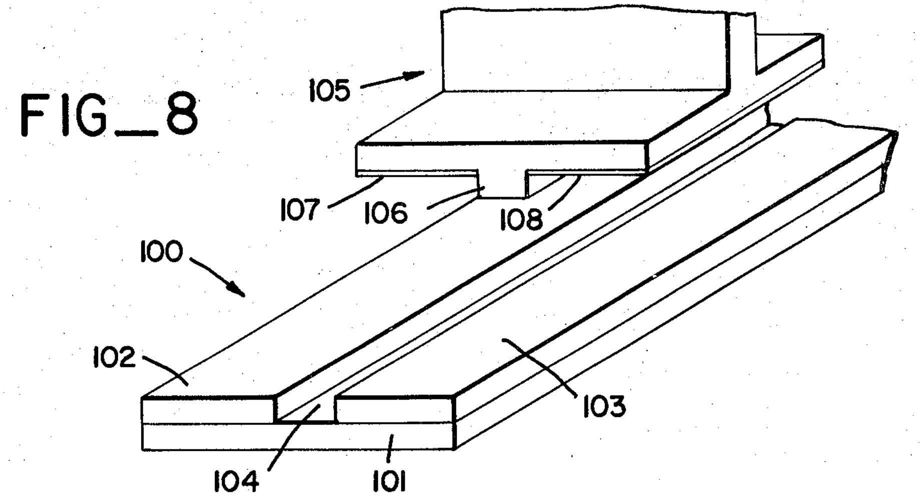
FIG. 8 is a fragmentary view in perspective of a modified form of bench-component carrier structure also embodying the principles of this invention.

As FIG. 8 shows, the invention is not restricted to an optical bench with a guide rail at one side. Here is a portion of a bench 100 having a flat bed 101 and two strips 102 and 103 of magnetic elastomer spaced apart by a slot 104. A component carrier 105 has a depending tongue 106 that engages snugly in the slot 104 for the purpose of alignment, while ferromagnetic flat pads 107 and 108 engage the strips 102 and 103 respectively by magnetic attraction.

Figure 9:
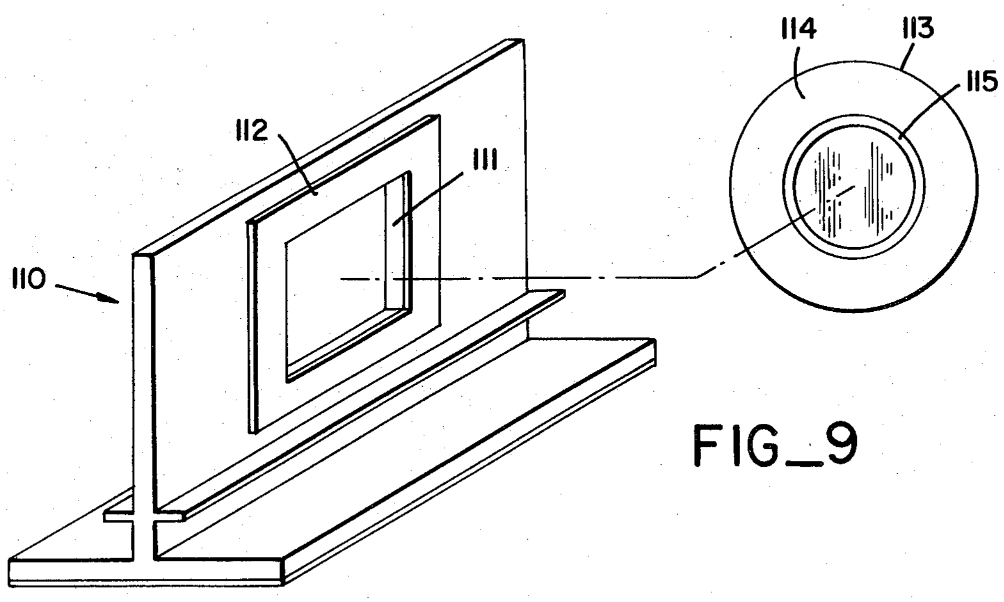
FIG. 9 is a partially exploded view mostly in perspective of a modified form of rotatable polarizer and a modified form of component carrier embodying the principles of the invention.

As FIG. 9 illustrates, a component carrier 110 may have a square opening 111 surrounded by a ferromagnetic frame 112, while a rotatable component 113 such as a polarizer may have a magnetic elastomer annulus 114 mounted on one surface for engagement of the frame 112 with magnetic attraction. In other words, the structure of FIG. 7 is reversed, with the magnetic elastomer on the component instead of on the component carrier. The polarizer 113 also has a cylindrical annular projection 115 that engages the square opening 111 to enable rotation.

Figure 10:
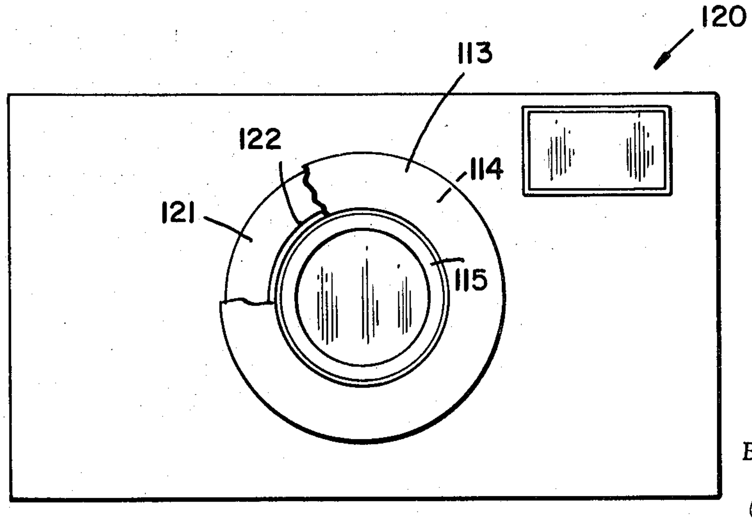
FIG. 10 is a simplified view in front elevation of a camera with a polarizer of this invention, like that of FIG. 9, mounted thereon.

FIG. 10 shows a camera 120 having the polarizer 113 mounted over its lens, the magnetic annulus 114 engaging a metal annulus 121 on the camera, while the annulus 115 is rotatable with respect to a lens housing 122. A second identical polarizer may be mounted over the polarizer 113 to enable darkening effects by relative rotation.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An optical element support system, including in combination a base member having a flat bed, magnetic plastic surface means deformable by heat and pressure, secured to said bed and providing a flat supporting surface, and a plurality of component carriers each having a base portion with a ferromagnetic metal on a flat surface thereof, whereby each said carrier is held in any desired position on said flat supporting surface by the magnetic attraction of said magnetic plastic surface means for the ferromagnetic metal.

2. The optical element support system of claim 1 wherein some of said component carriers comprise a flat frame portion perpendicular to and directly attached to said base portion and having a central square opening and at least one magnetic plastic surface around said opening, and a plurality of components each comprising a plate having on one flat face an area of ferromagnetic metal and carrying an instrument in a position for alignment with said central square opening.

3. The optical support system of claim 2 wherein said frame portion has two magnetic plastic surfaces, one on each of two opposite flat faces of said frame portion.

4. The optical support system of claim 3 wherein said frame portion has flat, component-aligning shelf means spaced from said base portion on at least one face thereof.

5. The optical support system of claim 2 wherein said component has a cylindrical portion inscribable in said square opening for relative rotation of said component in said carrier.

6. The optical support system of claim 1 wherein some of said component carriers comprise a flat frame portion perpendicular to and directly attached to said base portion and having a central square opening and an area of ferromagnetic metal therebeside and a plurality of components each comprising a plate having on one flat face an area of magnetic plastic surface and carrying an instrument in a position for alignment with said central square opening.

7. The optical support system of claim 6 wherein said frame portion has flat, component-aligning shelf means spaced above said base portion and below said opening at a lower portion of said frame portion on both faces thereof.

8. The optical support system of claim 6 wherein said component has a cylindrical portion inscribable in said square opening for relative rotation of said component in said carrier.

9. An optical element support system, including in combination a base member having a flat bed, magnetic plastic surface means secured to said bed and providing a flat surface, and a component carrier having a base portion with a ferromagnetic metal on a flat surface thereof and with a centering pin, a bracket rotatable around said pin and having component carrier means thereon, a stationary disc supported by said base portion and pin and having a magnetic plastic annulus on its outer surface, and a rotatable plate having a ferromagnetic surface for engagement with the outer surface of said annulus and a magnetic plastic surface on its opposite side for supporting additional component carriers.

10. An optical bench, including in combination a bench base having a flat bed and longitudinal guide means, magnetic plastic surface means deformable by heat and pressure secured to said bed and providing a flat bench surface, and a plurality of component carriers each having a base portion with ferromagnetic metal on a flat surface thereof and alignment means for engagement with said longitudinal guide means, whereby each said carrier is held in any desired position on said bench by the magnetic attraction of said magnetic plastic surface means for the ferromagnetic metal and by engagement of said alignment means with said guide means.

11. An optical bench, including in combination a bench base having a flat bed and longitudinal guide means, magnetic plastic surface means secured to said bed and providing a flat bench surface, and a component carrier having a base portion with ferromagnetic metal on a flat surface thereof, alignment means for engagement with said longitudinal guide means, and a centering pin, a bracket rotatable around said pin and having component carrier means thereon, a stationary disc supported by said base and pin and having a magnetic plastic annulus on its upper surface, and an upper rotatable plate having a ferromagnetic surface on its lower surface for engagement with said annulus and a magnetic plastic upper surface thereon for supporting additional component carriers.

12. An optical bench, including in combination a bench base having a horizontal bed with a guide rail along one edge of said bed and projecting above it, magnetic plastic surface means deformable by heat and pressure secured to said bed and providing a flat horizontal bench surface lying lower than the upper edge of said guide rail, and a plurality of component carriers each having a base with ferromagnetic metal on a flat bottom surface thereof and at least one straight edge, for engagement with the guide rail, whereby each said carrier is held in any desired position on said bench by the magnetic attraction of said magnetic plastic surface means for the ferromagnetic metal and by engagement of said straight edge with said guide rail, said carrier being slidable along said bench when pushed therealong by a force greater than the coefficient of friction between said magnetic plastic surface means and said ferromagnetic metal.

13. An optical bench, including in combination a pair of angle members having a horizontal surface and a vertical end, a horizontal bed bridging said angle members resting on their horizontal surfaces and against their vertical ends and having a scaled guide rail along one edge of said bed and projecting above it, a pair of magnetic plastic strips deformable by heat and pressure secured to said bed along its full length and spaced apart from each other, providing a horizontal bench surface lying lower than the upper edge of said guide rail, and a plurality of component carriers each having a base member with a flat pad of ferromagnetic metal on its bottom surface, said base member having at least one straight side edge, whereby each said carrier is held in any desired position on said bench by the magnetic attraction between said magnetic plastic strips and said pad and by engagement of its said straight side edge with said guide rail, said carrier being slidable along said bench when pushed therealong by a force greater than the coefficient of friction between said magnetic plastic strip and said flat pad.

14. An optical bench for use with a plurality of component carriers each having a ferromagnetic metal base including in combination a bench base having a flat bed and longitudinal guide means, and flexible magnetic plastic surface means deformable by heat and pressure secured to said bed and providing a flat bench surface.

15. The optical bench of claim 14 wherein said bench base has a horizontal bed with a guide rail along one edge of said bed and projecting above it.

16. The optical bench of claim 14 wherein said bench base comprises a pair of angle members having a horizontal surface and a vertical end, said bed being horizontal and bridging said angle members, resting on their horizontal surfaces and against their vertical ends, said bed having a scaled guide rail along one edge of said bed and projecting above it.

17. An assembly for use with an optical bench having a magnetic bench surface and a guide rail, including in combination a component carrier comprising an integral member having a base with a flat pad of ferromagnetic metal on its lower surface, said base having a straight side edge, and a vertical frame extending up directly from said base and having a central opening, said carrier also comprising at least one magnetic plastic surface member around said opening, and a component having a plate carrying an instrument for alignment with said opening and an area of ferromagnetic metal on one surface thereof.

18. The assembly of claim 17 having two said magnetic plastic members, one on each side of said vertical frame.

19. The assembly of claim 18 wherein said vertical frame has shelf means above said base and below said opening on both faces thereof.

20. The assembly of claim 17 wherein said component has a cylindrical portion in said opening for relative rotation of said component in said carrier.

21. A component carrier for an optical bench, comprising an integral extruded rigid member having a horizontal base portion with a flat pad of ferromagnetic metal on its bottom surface, a vertical frame portion extending directly up from said base portion and having a central opening, and at least one magnetic plastic surface on a face thereof around said opening.

22. A component carrier for a magnetically surfaced optical bench, comprising a base member having a flat pad of ferromagnetic metal on its bottom surface and a centering pin, a bracket rotatable around said pin and having component carrier means thereon, a stationary disc supported by said base and pin and having a magnetic plastic annulus on its upper surface, and an upper rotatable plate having a ferromagnetic surface on its lower surface for engagement with said annulus and a magnetic plastic upper surface thereon for supporting additional component carriers.

23. A polarizer assembly including in combination a polarizer carrier having a frame with a square central opening and at least one magnetic plastic surface member around said opening, a plate carrying a polarizer having an area of ferromagnetic metal on one surface thereof and a cylindrical portion projecting from said surface and inscribable in and rotatable with respect to said square opening, magnetic action being the only force holding the plate and carrier together.

* * * * *